(12) United States Patent
Zhang et al.

(10) Patent No.: US 12,304,314 B2
(45) Date of Patent: May 20, 2025

(54) DUAL-CLUTCH ASSEMBLY, HYBRID POWER SYSTEM, AND VEHICLE

(71) Applicant: CHERY AUTOMOBILE CO., LTD., Wuhu (CN)

(72) Inventors: Hengxian Zhang, Wuhu (CN); Zhiguang Zhou, Wuhu (CN); Dong Huang, Wuhu (CN); Lizhen Geng, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 0 days.

(21) Appl. No.: 18/699,232

(22) PCT Filed: Apr. 25, 2022

(86) PCT No.: PCT/CN2022/088908
§ 371 (c)(1),
(2) Date: Apr. 5, 2024

(87) PCT Pub. No.: WO2023/065624
PCT Pub. Date: Apr. 27, 2023

(65) Prior Publication Data
US 2024/0424881 A1    Dec. 26, 2024

(30) Foreign Application Priority Data

Oct. 22, 2021 (CN) .......................... 202111232576.7

(51) Int. Cl.
*B60K 6/387* (2007.10)
*B60K 6/26* (2007.10)
(Continued)

(52) U.S. Cl.
CPC ................ *B60K 6/387* (2013.01); *B60K 6/26* (2013.01); *B60K 6/365* (2013.01); *B60K 6/36* (2013.01)

(58) Field of Classification Search
CPC .. F16D 21/06; F16D 2021/0607; F16H 3/006; F16H 61/688; F16H 2063/025;
(Continued)

(56) References Cited

U.S. PATENT DOCUMENTS

| 3,892,302 A | 7/1975 | Rist | |
|---|---|---|---|
| 6,645,105 B2 * | 11/2003 | Kima | B60W 10/08 903/910 |

(Continued)

FOREIGN PATENT DOCUMENTS

| CN | 102059940 A | 5/2011 |
|---|---|---|
| CN | 103552461 A | 2/2014 |

(Continued)

OTHER PUBLICATIONS

International Search Report of the International Searching Authority for State Intellectual Property Office of the People's Republic of China in PCT application No. PCT/CN2022/088908 issued on Aug. 3, 2022, which is an international application to which this application claims priority.

(Continued)

*Primary Examiner* — Sherry L Estremsky
(74) *Attorney, Agent, or Firm* — Kolitch Romano Dascenzo Gates LLC

(57) ABSTRACT

A dual-clutch assembly is provided. The dual-clutch assembly includes a first rotating shaft, a second rotating shaft, a hollow shaft, a first clutch, and a second clutch. The first rotating shaft and the second rotating shaft are arranged coaxially at intervals, and the hollow shaft is sleeved outside the second rotating shaft. The first clutch is between the first rotating shaft and the second rotating shaft, a driving part of the first clutch is connected with the first rotating shaft, and a driven part of the first clutch is connected with the second rotating shaft. A driving part of the second clutch is posi- (Continued)

tioned on one side of the first clutch which is away from the second rotating shaft, and is connected with the first rotating shaft, and a driven part of the second clutch is connected with the hollow shaft.

9 Claims, 11 Drawing Sheets

(51) Int. Cl.
  *B60K 6/36* (2007.10)
  *B60K 6/365* (2007.10)
(58) Field of Classification Search
  CPC .......... B60K 6/387; B60K 6/26; B60K 6/365; B60K 6/36
  See application file for complete search history.

(56) References Cited

U.S. PATENT DOCUMENTS

| | | | |
|---|---|---|---|
| 6,712,734 | B1 | 3/2004 | Loeffler |
| 8,011,460 | B2 * | 9/2011 | Hobel ............... F16H 3/006 180/65.22 |
| 8,241,161 | B2 * | 8/2012 | Schoenek ............ B60K 6/48 475/5 |
| 8,579,751 | B2 * | 11/2013 | Phillips ............ B60W 10/08 475/221 |
| 8,771,139 | B2 * | 7/2014 | Ideshio ............ B60L 3/0061 477/14 |
| 9,194,483 | B2 * | 11/2015 | Igarashi ........... F16H 57/0479 |
| 9,579,966 | B2 * | 2/2017 | Luehrs ............ B60W 10/08 |
| 11,686,354 | B2 * | 6/2023 | Hahn ............ B60K 6/387 192/70.11 |
| 2007/0175723 | A1 | 8/2007 | Blessing |
| 2011/0015022 | A1 | 1/2011 | Stoeckl et al. |
| 2015/0083546 | A1 | 3/2015 | Moser et al. |
| 2015/0105203 | A1 * | 4/2015 | Kim ............... B60K 6/48 475/5 |
| 2015/0184732 | A1 | 7/2015 | Lee et al. |
| 2016/0325728 | A1 | 11/2016 | Yang et al. |
| 2021/0079982 | A1 | 3/2021 | He |

FOREIGN PATENT DOCUMENTS

| | | | | |
|---|---|---|---|---|
| CN | 104204585 | A | 12/2014 | |
| CN | 104648115 | A | 5/2015 | |
| CN | 104712674 | A | 6/2015 | |
| CN | 104747661 | A | 7/2015 | |
| CN | 104786817 | A | 7/2015 | |
| CN | 108725177 | A | 11/2018 | |
| CN | 109228841 | A | 1/2019 | |
| CN | 109278524 | A | 1/2019 | |
| CN | 110667366 | A | 1/2020 | |
| CN | 111114278 | A | 5/2020 | |
| CN | 111619331 | A | 9/2020 | |
| CN | 111619334 | A | 9/2020 | |
| CN | 113978237 | A | 1/2022 | |
| DE | 102009006422 | A1 * | 7/2010 | ............. F16D 21/06 |
| DE | 102010061827 | A1 * | 5/2012 | ............. B60K 6/387 |
| DE | 102018203207 | A1 | 9/2019 | |
| EP | 1127230 | A1 | 8/2001 | |
| EP | 2062770 | A1 | 5/2009 | |
| GB | 768342 | A | 2/1957 | |
| JP | 2009154610 | A * | 7/2009 | ............. F16H 3/006 |
| KR | 20190027442 | A | 3/2019 | |
| RU | 2357125 | C1 | 5/2009 | |
| RU | 2618661 | C1 | 5/2017 | |
| SU | 74923 | A1 | 11/1948 | |
| SU | 1052149 | A3 | 10/1983 | |
| WO | 2015113417 | A1 | 8/2015 | |
| WO | 2021046942 | A1 | 3/2021 | |

OTHER PUBLICATIONS

China National Intellectual Property Administration, Notification to grant patent right for invention of Chinese application No. 202111232576.7 issued on Jun. 29, 2023, which is foreign counterpart application of this US application.

Liu, Fei; "Structure Design and Study on Dry Dual Clutch Automatic Transmission", Chinese Excellent Master's thesis Full-text database electronic journal Engineering Science and Technology II series, No. 4, Apr. 15, 2011, entire document, English translation of abstract provided.

Nie, Guanghui; "BYD Tang six-speed dual clutch automatic transmission power transmission", Technology and Industry Across the Straits, Issue 11, Nov. 15, 2016, entire document.

Yang, Dongsheng, et al.; "A hybrid drive system based on dual clutch transmission", Automobile Applied Technology, Issue 02, Feb. 26, 2016, entire document.

Yu, Feng, et al.; "Configuration and Shifting Principle of Dual Clutch Automatic Transmission", Mechanical Engineer, Issue 09, Sep. 10, 2009, entire document.

Zhong, Jie, et al.; "An electromechanical coupled hybrid power system with a dual clutch based on the AMT", Light Vehicle Technology, Issue Z3, Aug. 15, 2010, entire document.

Extended European Search Report Communication Pursuant to Rule 62 EPC for European Application No. 22882249.0 dated Nov. 11, 2024, which is a foreign counterpart application to this application.

Decision on Grant of Russian Application No. 2024108053/11 issued on Sep. 30, 2024.

* cited by examiner

DUAL-CLUTCH ASSEMBLY, HYBRID POWER SYSTEM, AND VEHICLE

The present disclosure is a US national stage of international application No. PCT/CN2022/088908, filed on Apr. 25, 2022, which claims priority to Chinese Patent Application No. 202111232576.7, filed on Oct. 22, 2021 and entitled "HYBRID POWER SYSTEM", the disclosures of which are herein incorporated by reference in their entireties.

TECHNICAL FIELD

The present disclosure relates to the technical field of automobiles, in particular to a dual-clutch assembly, a hybrid power system, and a vehicle.

BACKGROUND

Most traditional automobiles use fossil fuels (such as gasoline and diesel oil) to provide power for engines, and their exhaust will pollute the environment. Therefore, it is urgent to replace fossil fuels with new pollution-free energy sources (such as electric energy) to provide power for automobiles, and thus new energy automobiles are the development trend.

Dual clutches are usually used in a hybrid power system to achieve multi-gear switching. The dual clutches in the related art need to be replaced as a whole in the event that one of the clutches does not work and requires maintenance and replacement, which result in high maintenance costs.

SUMMARY

Embodiments of the present disclosure provide a dual-clutch assembly, a hybrid power system, and a vehicle.

The technical solutions are as follows:

In a first aspect, a dual-clutch assembly is provided, including a first rotating shaft, a second rotating shaft, a hollow shaft, a first clutch, and a second clutch, where the first rotating shaft and the second rotating shaft are arranged coaxially at intervals, and the hollow shaft is sleeved outside the second rotating shaft; the first clutch is between the first rotating shaft and the second rotating shaft, a driving part of the first clutch is connected with the first rotating shaft and a driven part of the first clutch is connected with the second rotating shaft; and a driving part of the second clutch is on one side of the first clutch and is connected with the first rotating shaft, wherein the one side is away from the second rotating shaft. A driven part of the second clutch is connected with the hollow shaft.

Optionally, the second rotating shaft includes a rod body and a first transmission cylinder, and the first transmission cylinder is at one end of the rod body, sleeved outside the first clutch, and connected with the driven part of the first clutch; and the hollow shaft includes a tube body and a second transmission cylinder, the second transmission cylinder is at one end of the tube body, sleeved outside the second clutch and the first transmission cylinder, and connected with the driven part of the second clutch.

In a second aspect, a hybrid power system is provided, including the dual-clutch assembly as described hereinbefore, an engine, a first motor, a first gear train, and a second gear train, where the engine and the first motor are both in transmission connection with the first rotating shaft; and an input gear of the first gear train is coaxially connected to the second rotating shaft, an input gear of the second gear train is coaxially connected to the hollow shaft, and an output gear of the first gear train and an output gear of the second gear train are both in transmission connection with a wheel.

Optionally, the dual-clutch assembly further includes a first transmission cylinder and a second transmission cylinder, the first transmission cylinder is in the second transmission cylinder and coaxially arranged with the second transmission cylinder, where the first clutch is in the first transmission cylinder, the driven part of the first clutch is connected with the inner wall of the first transmission cylinder and the driving part of the first clutch is coaxially connected with the first rotating shaft, and the first transmission cylinder is coaxially connected with the second rotating shaft; the second clutch is in the second transmission cylinder, the driven part of the second clutch is connected with the inner wall of the second transmission cylinder and the driving part of the second clutch is coaxially connected with the first rotating shaft, and the second transmission cylinder is coaxially connected with the hollow shaft.

Optionally, the hybrid power system further includes a planetary gear train, which includes a ring gear, a center gear, a plurality of planetary gears, and a planet carrier, where the center gear is in the ring gear; the planetary gear is between the center gear and the ring gear and engages with the center gear and the ring gear; the planet carrier is arranged coaxially with the center gear and connected with the plurality of planetary gears; and the engine is connected with the planet carrier; the planet carrier is coaxially connected with the first rotating shaft, the first motor is connected with the center gear, and the ring gear is locked.

Optionally, the planetary gear train is in a rotor of the first motor, and the center gear is connected with the rotor of the first motor.

Optionally, the hybrid power system further includes an annular plate, where the annular plate is movably sleeved outside the first rotating shaft and in the rotor of the first motor, an outer edge of the annular plate is connected with an inner wall of the first motor, and an inner edge of the annular plate is coaxially connected with the center gear.

Optionally, the hybrid power system further includes a second motor and a third rotating shaft, where the second motor is in transmission connection with the third rotating shaft; and the output gear of the first gear train and the output gear of the second gear train are both coaxially sleeved outside the third rotating shaft, and the third rotating shaft is in transmission connection with the wheel.

Optionally, the hybrid power system further includes a third gear train and a synchronizer, where an input gear of the third gear train is coaxially connected with the second motor, and an output gear of the third gear train is movably sleeved outside the third rotating shaft; and the synchronizer is sleeved outside the third rotating shaft and configured to connect or disconnect the third rotating shaft to the output gear of the third gear train.

Optionally, the hybrid power system further includes a third gear train and a third clutch, where an input gear of the third gear train is coaxially connected with the second motor through the third clutch, and an output gear of the third gear train is fixedly sleeved outside the third rotating shaft.

Optionally, the hybrid power system further includes a power supply assembly, which includes a battery and two inverters, where each of the two inverters is connected to the battery, the first motor is connected with one of the two inverters, and the second motor is connected with the other.

Optionally, the hybrid power system further includes a fourth clutch, where the fourth clutch is connected between the first rotating shaft and the engine.

In a third aspect, a vehicle is provided. The vehicle includes the hybrid power system as described hereinbefore.

The technical solutions according to the embodiments of the present disclosure at least achieve the following beneficial effects.

In the hybrid power system provided according to the embodiments of the present disclosure, the driving part of the first clutch and the driving part of the second clutch are both connected with the first rotating shaft; the driven part of the first clutch is connected with the second rotating shaft, and the driven part of the second clutch is connected with the hollow shaft. In this way, the power, after being transmitted to the two clutches via the first rotating shaft, is transmitted to different speed change mechanisms through the two clutches respectively to achieve a variable speed transmission.

As the driving parts of the two clutches are both connected with the first rotating shaft to receive power, and the driven parts of the two clutches are no longer installed together inside a same supporting cylinder but are connected separately with different speed change mechanisms, maintenance can be completed by replacing only one of the clutches if one of them is damaged, without having to dismantle and replace both clutches at the same time. In this way, the efficiency of maintenance can be improved, and the cost of maintenance can be reduced. Meanwhile, the hollow shaft is sleeved outside the second rotating shaft, that is, the second rotating shaft has to pass through the hollow shaft to be connected to the driven part of the first clutch, and thus the two clutches are stacked in the axial direction so that one clutch is provided inside the other clutch, which effectively reduces the axial dimension of the transmission structure without increasing the space occupied by the power system in a vehicle.

BRIEF DESCRIPTION OF THE DRAWINGS

For clearer illustration of the technical solutions in the embodiments of the present disclosure, the drawings required to be used in the description of the embodiments are briefly introduced below. It is apparent that the drawings in the description below are only for some embodiments of the present disclosure, and for those of ordinary skill in the art, other drawings can be acquired according to the drawings without creative efforts.

DETAILED DESCRIPTION

For clearer descriptions of the objectives, technical solutions, and advantages of the present disclosure, the embodiments of the present disclosure are further described in detail below with reference to the accompanying drawings.

Unless otherwise defined, technical or scientific terms used herein shall have the ordinary meaning as understood by those of ordinary skill in the art to which the present disclosure belongs. The terms "first", "second", "third", and other similar words, as used in the specification and in the claims of the patent application of the present disclosure, do not indicate any order, quantity, or importance, but are merely defined to distinguish different components. Likewise, the terms "a", "an" or other similar words do not indicate a limitation of quantity, but rather the presence of at least one. The terms "include", "comprise" or other similar words indicate that the elements or objects stated before "include" or "comprise" encompass the elements or objects and equivalents thereof listed after "include" or "comprise", but do not exclude other elements or objects. The terms "connecting", "connected", or other similar words are not limited to physical or mechanical connections, but may include electrical connections, whether direct or indirect. The terms "up", "down", "left", "right", "top", "bottom", and the like are merely defined to indicate relative positional relationships. In the case that the absolute position of a described object changes, the relative position relationship may also change accordingly.

Figure 1:
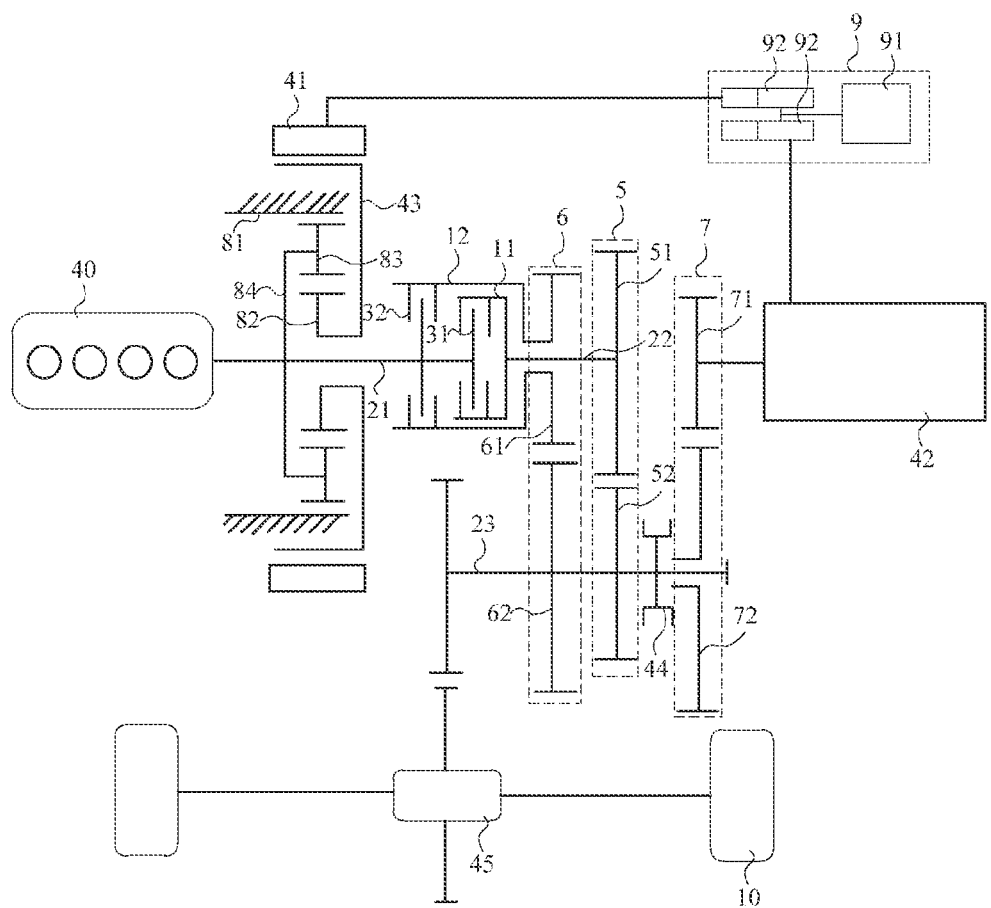
FIG. 1 is a schematic structural diagram of a hybrid power system according to an embodiment of the present disclosure.

FIG. 1 is a schematic structural diagram of a hybrid power system according to an embodiment of the present disclosure. As shown in FIG. 1, a transmission structure includes a dual-clutch assembly, an engine 40, a first motor 41, a first gear train 5, and a second gear train 6.

Figure 2:
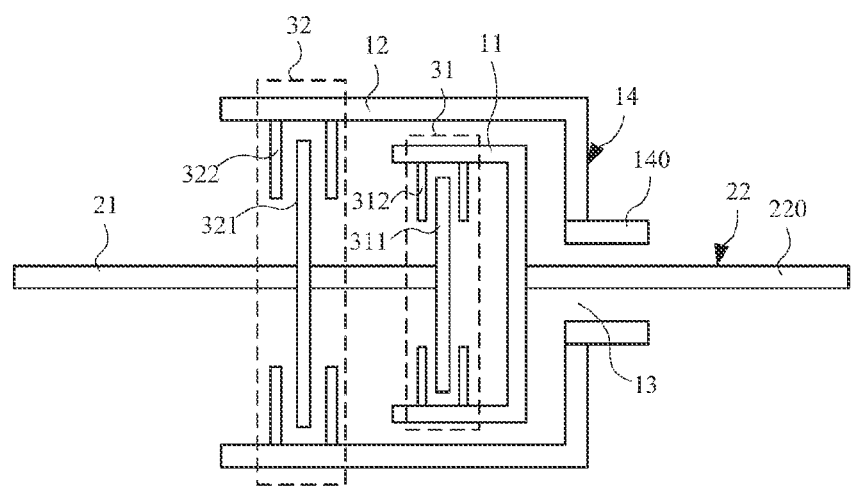
FIG. 2 is a schematic structural diagram of a dual-clutch assembly according to an embodiment of the present disclosure.

FIG. 2 is a schematic structural diagram of a dual-clutch assembly according to an embodiment of the present disclosure. As shown in FIG. 2, the dual-clutch assembly includes a first rotating shaft 21, a second rotating shaft 22, a hollow shaft 14, a first clutch 31, and a second clutch 32. The first rotating shaft 21 and the second rotating shaft 22 are arranged coaxially at intervals, and the hollow shaft 14 is sleeved outside the second rotating shaft 22. The first clutch 31 is between the first rotating shaft 21 and the second rotating shaft 22, a driving part 311 of the first clutch 31 is connected with the first rotating shaft 21, and a driven part 312 of the first clutch 31 is connected with the second rotating shaft 22. A driving part 321 of the second clutch 32 is disposed on one side, away from the second rotating shaft 22, of the first clutch 31 and is connected with the first rotating shaft 21, and a driven part 322 of the second clutch 32 is connected with the hollow shaft 14.

As shown in FIG. 1, the engine 40 and the first motor 41 are both in transmission connection with the first rotating shaft 21.

As shown in FIG. 1, an input gear 51 of the first gear train 5 is coaxially connected with the second rotating shaft 22; an input gear 61 of the second gear train 6 is coaxially connected with the hollow shaft 14; and an output gear 52 of the first gear train 5 and an output gear 62 of the second gear train 6 are both in transmission connection with a wheel 10.

Referring to FIG. 2, in the hybrid power system provided according to the embodiments of the present disclosure, the driving part 311 of the first clutch 31 and the driving part 321 of the second clutch 32 are both connected with the first rotating shaft 21; and the driven part 312 of the first clutch 31 is connected with the second rotating shaft 22, and the driven part 322 of the second clutch 32 is connected with the hollow shaft 14. In this way, after being transmitted to the two clutches via the first rotating shaft 21, the power is transmitted to different speed change mechanisms through the two clutches respectively to achieve a variable speed transmission.

As the driving parts of the two clutches are both connected with the first rotating shaft 21 to receive power, and the driven parts of the two clutches are no longer installed together inside a same supporting cylinder but are connected separately with different speed change mechanisms, maintenance can be completed by replacing only one of the clutches if one of them is damaged, without having to dismantle and replace both clutches at the same time, thereby improving the efficiency of maintenance and reducing the cost of maintenance. Meanwhile, the hollow shaft 14 is sleeved outside the second rotating shaft 22, that is, the second rotating shaft 22 has to pass through the hollow shaft 14 to be connected to the driven part 312 of the first clutch 31, and thus the two clutches are stacked in the axial direction so that one clutch is provided inside the other clutch, which effectively reduces the axial dimension of the transmission structure without increasing the space occupied by the power system in a vehicle.

The driven part may be a flywheel of the clutch, and the driving part may be a driven plate of the clutch. As the two clutches can transmit power in two directions, the driven plate can be driven to rotate together with the flywheel plate in the case that the flywheel plate serves as the driving part, and the flywheel can be driven to rotate together with the driven plate in the case that the driven plate serves as the driving part. In the case that the clutch is in a separated state, the flywheel of the clutch and the driven plate of the clutch are separated from each other, such that components connected to the flywheel and components connected to the driven plate cannot transmit power. In the case that the clutch is in a combined state, the flywheel of the clutch and the driven plate of the clutch are combined with each other, and the flywheel can drive the driven plate to rotate, such that the power from the components connected to the flywheel can be transmitted to the components connected to the driven plate.

In embodiments of the present disclosure, during operation of the hybrid power system, the engine 40 and the first motor 41 are both in transmission connection with the first rotating shaft 21 so as to transmit power to the first rotating shaft 21 and to the driving part 311 of the first clutch 31 and the driving part 321 of the second clutch 32 both coaxially connected with the first rotating shaft 21.

Referring to FIG. 1, after the first clutch 31 is controlled to be in the combined state, the power generated by the engine 40 and the first motor 41 is transmitted to the first gear train 5 through the first clutch 31 and a first transmission cylinder 11, and eventually transmitted to the wheel 10 through the output gear 52 of the first gear train 5 to drive the vehicle.

After the second clutch 32 is controlled to be in the combined state, the power generated by the engine 40 and the first motor 41 is transmitted to the second gear train 6 through the second clutch 32 and the second transmission cylinder 12, and eventually transmitted to the wheel 10 through the output gear 62 of the second gear train 6 to drive the vehicle.

In the case that the hybrid power system is in operation, the power source is in transmission connection with the first rotating shaft 21, and power is transmitted to the two clutches and then to different gear trains through the two transmission cylinders respectively, achieving the purpose of multi-gear switching.

In embodiments of the present disclosure, transmission ratios of the first gear train 5 and the second gear train 6 are different. Therefore, switching connection to the first gear train 5 or the second gear train 6 allows the engine 40 and the first motor 41 to drive the vehicle in different gear modes.

In embodiments of the present disclosure, the first gear train 5 and the second gear train 6 both include at least an input gear and an output gear, and the input gear and the output gear are in the transmission connection, such that power is transmitted through the input gear to the output gear.

Optionally, the input gear 51 and the output gear of the first gear train 5 are directly engaged, and the input gear 61 and the output gear of the second gear train 6 are directly engaged, so as to achieve the transmission connection between the input gear and the output gear. At least one connecting gear is further arranged between the input gear and the output gear. For example, in the case that only one connecting gear is provided, the connecting gear is engaged with the input gear and the output gear, respectively, so as to achieve the transmission connection between the input gear and the output gear.

It should be noted that the specific number of gears to be provided in the first gear train 5 and the second gear train 6 is determined according to actual demands. As the number of gears arranged in the gear train affects the transmission ratio of the gear train, the number of gears in the gear train may be adjusted according to the power demand of an automobile.

As shown in FIG. 2, the second rotating shaft 22 includes a rod body 220 and the first transmission cylinder 11; and the first transmission cylinder 11 is disposed at one end of the rod body 220, the first transmission cylinder 11 is sleeved outside the first clutch 31, and the first transmission cylinder 11 is connected with the driven part 312 of the first clutch 31.

As shown in FIG. 2, the hollow shaft 14 includes a tube body 140 and a second transmission cylinder 12; and the second transmission cylinder 12 is disposed at one end of the tube body 140, sleeved outside the second clutch 32 and the first transmission cylinder 11, and connected to the driven part 322 of the second clutch 32.

The first clutch 31 and the second clutch 32 are provided within the first transmission cylinder 11 and the second transmission cylinder 12, respectively, such that the two clutches can use separate transmission cylinders as mounting carriers. In this way, maintenance can be completed by replacing only one of the transmission cylinders and the clutch mounted thereon, if one of the transmission cylinders is damaged, without having to dismantle and replace both clutches at the same time, thereby improving the efficiency of maintenance and reducing the cost of maintenance. Meanwhile, the second transmission cylinder 12 is sleeved outside the first transmission cylinder 11, so that one clutch is arranged inside the other clutch, which effectively reduces the axial dimension of the transmission structure without increasing the space occupied by the power system in the vehicle.

Optionally, as shown in FIG. 1, both the first transmission cylinder 11 and the second transmission cylinder 12 have an open end and a closed end which are oppositely arranged, and both the open end of the first transmission cylinder 11 and the open end of the second transmission cylinder 12 face a same side. Setting the open end of the first transmission cylinder 11 and the open end of the second transmission cylinder 12 towards the same side facilitates assembly.

As shown in FIG. 1 and FIG. 2, the transmission structure further includes the second rotating shaft 22. The closed end of the second transmission cylinder 12 is provided with a through hole 13, and the second rotating shaft 22 is in the through hole 13 and is coaxially connected at one end with the closed end of the first transmission cylinder 11.

As the first transmission cylinder 11 is inserted into the second transmission cylinder 12, for facilitating the transmission of the power from the first transmission cylinder 11 to the outside of the second transmission cylinder 12, the through hole 13 is formed at the closed end of the second transmission cylinder 12, and one end of the second rotating shaft 22 is passed through the through hole 13, such that one end of the second rotating shaft 22 is coaxially connected with the closed end of the first transmission cylinder 11. In this way, as the first transmission cylinder 11 rotates in the second transmission cylinder 12, the power can also be transmitted to the gear train, which is in a transmission connection with the first transmission cylinder 11, through the first rotating shaft 21, thereby achieving the purpose of power transmission.

Exemplarily, a bearing is further provided in the second transmission cylinder 12. An outer ring of the bearing is connected with an inner wall of the second transmission cylinder 12, and an inner ring of the bearing is sleeved on the first transmission cylinder 11 and connected with an outer wall of the first transmission cylinder 11. The inner ring of the bearing is rotatably inserted into the outer ring of the bearing. Therefore, after the first transmission cylinder 11 is inserted into the second transmission cylinder 12, the purpose of movably inserting the first transmission cylinder 11 into the second transmission cylinder 12 can be achieved by using the bearing as a mounting carrier.

Optionally, as shown in FIG. 2, one end of the hollow shaft 14 is coaxially connected with the through hole 13, and the second rotating shaft 22 is rotatably inserted into the hollow shaft 14.

The other end of the hollow shaft 14 is configured to be coaxially connected with the input gear of the gear train so as to transmit the power from the second transmission cylinder 12 to the gear train. Meanwhile, the second rotating shaft 22 is inserted into the hollow shaft 14, and the second rotating shaft 22 is limited by the inner wall of the hollow shaft 14, such that a large deviation is avoided after the second rotating shaft 22 is inserted into the through hole 13, and the positioning for the assembly of the first transmission cylinder 11 is also achieved.

Exemplarily, a bearing is further provided in the hollow shaft 14. An outer ring of the bearing is connected with the inner wall of the hollow shaft 14, and an inner ring of the bearing is sleeved on the second rotating shaft 22 and connected with the outer wall of the second rotating shaft 22. The inner ring of the bearing is rotatably inserted inside the outer ring of the bearing. Therefore, after the second rotating shaft 22 is inserted into the hollow shaft 14, the purpose of movably inserting the second rotating shaft into the hollow shaft 14 can be achieved by using the bearing as a mounting carrier.

Optionally, as shown in FIG. 1, the hybrid power system further includes a planetary gear train, which includes a ring gear 81, a center gear 82, a plurality of planetary gears 83, and a planet carrier 84. The center gear 82 is in the ring gear 81, the planetary gear 83 is between the center gear 82 and the ring gear 81, and the planetary gear 83 engages with the center gear 82 and the ring gear 81. The planet carrier 84 is coaxially arranged with the center gear 82, and the planet carrier 84 is connected with the plurality of planetary gears 83.

As shown in FIG. 1, the engine 40 is coaxially connected with the planet carrier 84; the planet carrier 84 is coaxially connected with the first rotating shaft 21; the first motor 41 is coaxially connected with the center gear 82; and the ring gear 81 is locked.

In the embodiment described above, the first motor 41 is connected to the first rotating shaft 21 through the planetary gear train, and power from the first motor 41 is transmitted to the first rotating shaft 21 through the center gear 82, the planetary gear 83, and the planet carrier 84 in sequence.

Moreover, in the case that the engine 40 and the first motor 41 work together, the rotation speed of the first motor 41 can be adjusted under the condition that the planet carrier 84 meets the output rotation speed. This adjustment reduces the power output of the engine 40, thereby saving energy and achieving efficient utilization of the engine 40.

As shown in FIG. 1, the planetary gear train is in the rotor of the first motor 41, and the center gear 82 is connected with the rotor of the first motor 41. By providing the planetary gear train in the rotor of the first motor 41, the axial dimension of the hybrid power system can be reduced without increasing the overall dimension of the hybrid power system.

As shown in FIG. 1, the hybrid power system further includes an annular plate 43. The annular plate 43 is movably sleeved outside the first rotating shaft 21 and in the rotor of the first motor 41; an outer edge of the annular plate 43 is connected with the inner wall of the first motor 41, and an inner edge of the annular plate 43 is coaxially connected with the center gear 82.

The annular plate 43 is disposed at one end of the first motor 41, such that the annular plate 43 does not occupy too much space for installing the planetary gear train after the annular plate 43 is assembled with the first motor 41, which is conducive to reducing the overall dimension of the hybrid power system. Meanwhile, the annular plate 43 is between the planetary gear train and the second transmission cylinder 12. The partition provided by the annular plate 43 effectively prevents the interference issues that arise between the second transmission cylinder 12 and the planetary gear train due to the small distance between the second transmission cylinder 12 and the planetary gear train, thus improving reliability.

Optionally, as shown in FIG. 1, the hybrid power system further includes a second motor 42 and a third rotating shaft 23. The second motor 42 is in transmission connection with the third rotating shaft 23; the output gear 52 of the first gear train 5 and the output gear 62 of the second gear train 6 are both coaxially sleeved outside the third rotating shaft 23, and the third rotating shaft 23 is in transmission connection with the wheel 10.

In the embodiment described above, the second motor 42 is further provided, and the second motor 42 is integrated into the hybrid power system through the third rotating shaft 23, such that the second motor 42 can also drive the vehicle and the power performance of the hybrid power system is enhanced.

As shown in FIG. 1, the hybrid power system further includes a third gear train 7 and a synchronizer 44. An input gear 71 of the third gear train 7 is coaxially connected with the second motor 42, and an output gear 72 of the third gear train 7 is movably sleeved outside the third rotating shaft 23.

The synchronizer 44 is sleeved outside the third rotating shaft 23, and the synchronizer 44 is configured to connect or disconnect the third rotating shaft 23 to the output gear 72 of the third gear train 7.

In the embodiment described above, by controlling the movement of the synchronizer 44 on the third rotating shaft 23, the synchronizer 44 is controlled to connect or disconnect with the output gear 72 of the third gear train 7. That is, the output gear 72 of the third gear train 7 is in transmission connection with the third rotating shaft 23 through the synchronizer 44. The second motor 42 is coaxially connected with the input gear 71 of the third gear train 7. Therefore, the synchronizer 44 controls the connection and disconnection of power between the third rotating shaft 23 and the second motor 42.

Thus, in the case that the second motor 42 is not required to work, the synchronizer 44 controls the disconnection between the second motor 42 and the third rotating shaft 23, thereby preventing the power output from the engine 40 from dragging the second motor 42 to rotate and effectively mitigating energy loss.

In the embodiments of the present disclosure, the third gear train 7 at least includes an input gear and an output gear, and the input gear and the output gear are in transmission connection, such that the power can be transmitted to the output gear through the input gear.

Optionally, the input gear 71 and the output gear of the third gear train 7 are directly engaged to achieve a transmission connection between the input gear and the output gear. At least one connecting gear is further arranged between the input gear and the output gear. For example, in the case that only one connecting gear is arranged, the connecting gear is engaged with the input gear and the output gear, respectively, to achieve the transmission connection between the input gear and the output gear.

It should be noted that the specific number of gears to be arranged in the third gear train 7 is determined according to actual demands. As the number of gears arranged in the gear train affects the transmission ratio of the gear train, the number of gears in the gear train may be adjusted according to the power demand of a vehicle.

Figure 3:
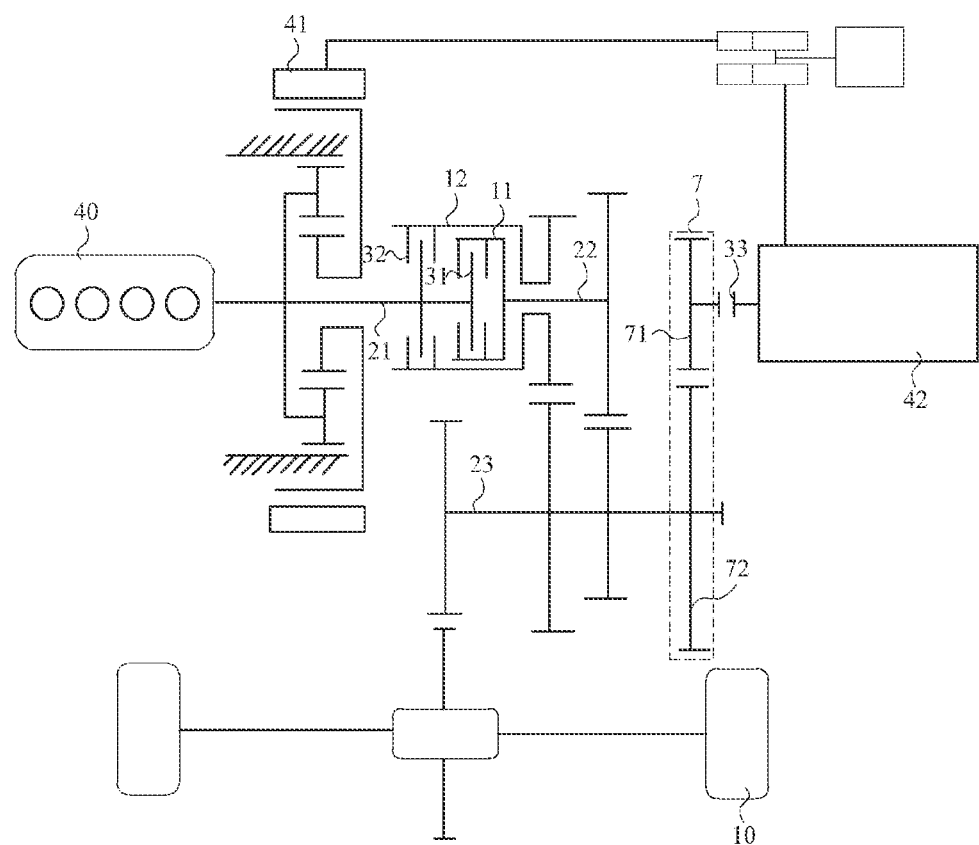
FIG. 3 is a schematic structural diagram of a hybrid power system according to an embodiment of the present disclosure.

FIG. 3 is a schematic structural diagram of a hybrid power system according to an embodiment of the present disclosure. As shown in FIG. 3, the hybrid power system further includes a third gear train 7 and a third clutch 33. The input gear 71 of the third gear train 7 is coaxially connected with the second motor 42, and the output gear 72 of the third gear train 7 is fixedly sleeved outside the third rotating shaft 23. The third clutch 33 is connected between the input gear 71 of the third gear train 7 and the second motor 42.

In the embodiment described above, the second motor 42 is coaxially connected with the input gear 71 of the third gear train 7, and the output gear 72 of the third gear train 7 is fixedly sleeved outside the third rotating shaft 23. The third clutch 33 is provided between the input gear 71 of the third gear train 7 and the second motor 42. In this way, the third clutch 33 is allowed to disconnect or connect the second motor 42 to the third rotating shaft 23.

In this way, in the case that the second motor 42 is not required to work, the third clutch 33 can be controlled to be in a separated state such that the second motor 42 and the third rotating shaft 23 are disconnected from each other, thereby avoiding the power output from the engine 40 or the first motor 41 from being transmitted to the second motor 42 through the third rotating shaft 23 to drag the second motor 42 to rotate, and effectively mitigating energy loss.

Figure 4:
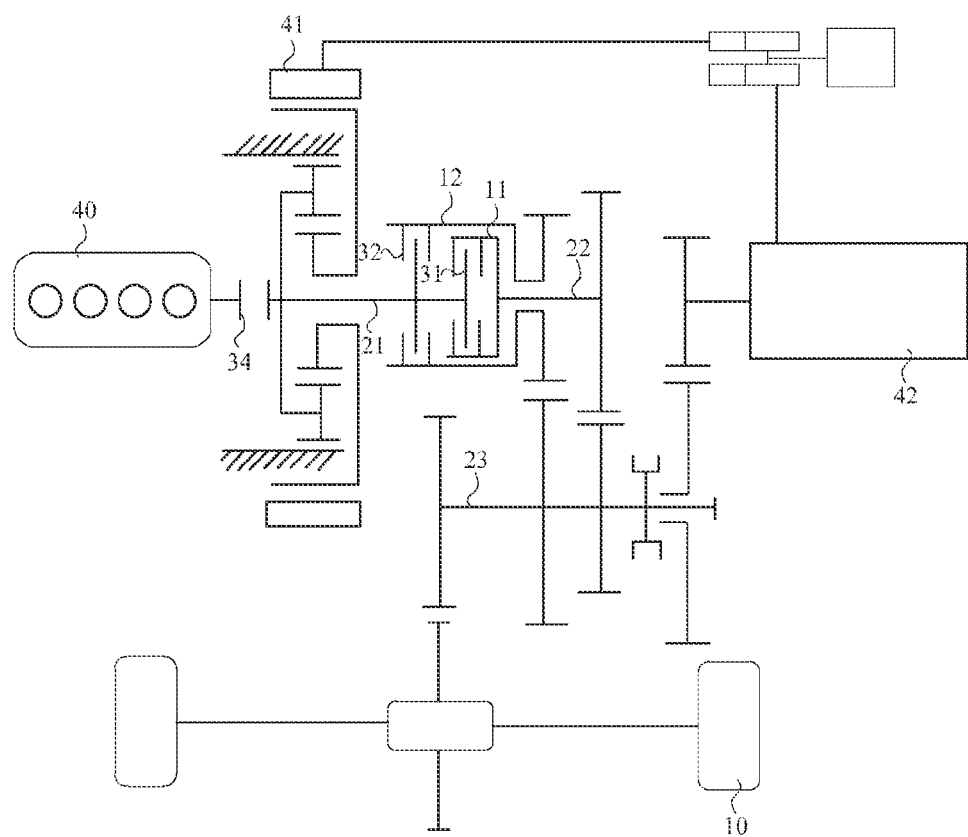
FIG. 4 is a schematic structural diagram of a hybrid power system according to an embodiment of the present disclosure.

FIG. 4 is a schematic structural diagram of a hybrid power system according to an embodiment of the present disclosure. As shown in FIG. 4, the hybrid power system further includes a fourth clutch 34, and the fourth clutch 34 is connected between the planet carrier 84 and the engine 40.

The fourth synchronizer 44 is configured to interrupt the power transmission between the engine 40 and the first rotating shaft 21. In this way, in the case that the engine 40 is not required to work, the fourth clutch 34 is controlled to be in a separated state to interrupt the power transmission between the engine 40 and the first rotating shaft 21, and avoid energy loss.

Optionally, as shown in FIG. 1, the hybrid power system further includes a differential 45. An input gear of the differential 45 is a in transmission connection with the third rotating shaft 23, and the differential 45 is in a transmission connection with the wheel 10.

In the embodiments of the present disclosure, the input gear of the differential 45 is in transmission connection with the third rotating shaft 23 to receive the power transmitted from the third rotating shaft 23 for driving the wheel 10 to rotate.

The differential 45 enables the wheel 10 connected to the differential 45 to realize turning at different speeds. In the case that an automobile makes a turn, a turning radius of an inner wheel 10 of the automobile is different from that of an outer wheel 10 of the automobile, and the turning radius of the outer wheel 10 is larger than that of the inner wheel 10, which requires that the rotation speed of the outer wheel 10 to be higher than that of the inner wheel 10 when turning. The use of the differential 45 can enable the two wheels 10 to roll at different rotation speeds, so as to realize rotation speeds of the two wheels 10 to be different.

Optionally, as shown in FIG. 1, a power supply assembly 9 includes a battery 91 and two inverters 92. The two inverters 92 are connected to the battery 91, the first motor 41 is connected to one of the two inverters 92, and the second motor 42 is connected to the other.

The two inverters 92 are provided, with one configured to connect the battery 91 and the first motor 41 and the other configured to connect the battery 91 and the second motor 42. The battery 91 is a rechargeable battery 91, and the inverter 92 is provided on an output circuit of the battery 91 and is configured to convert a direct current output from the battery 91 into a three-phase alternating current to drive the first motor 41 or the second motor 42.

In the embodiments of the present disclosure, a method for controlling a hybrid power system is provided. The method is applicable to the hybrid power system as described hereinbefore and includes: determining a power mode; and controlling operating states of the engine and the first motor, and connection states of the first clutch and the second clutch according to the power mode.

The power mode includes an engine-only mode, a pure-electric mode, a hybrid driving mode, and a power recovery mode.

As an example, the hybrid power system shown in FIG. 2 is used to briefly illustrate the control methods for the modes described above.

Figure 5:
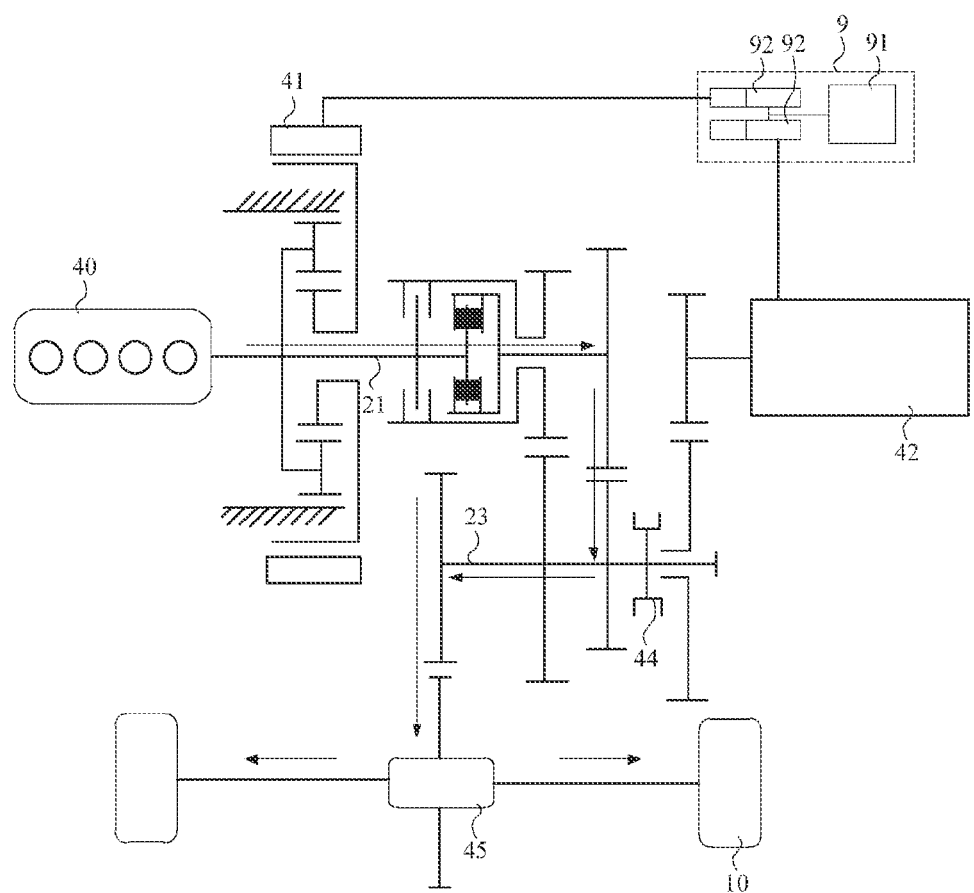
FIG. 5 is a schematic diagram illustrating power transfer of a hybrid power system in an engine-only mode according to an embodiment of the present disclosure.

FIG. 5 is a schematic diagram illustrating the power transfer of a hybrid power system in an engine-only mode according to an embodiment of the present disclosure. As shown in FIG. 5, in the engine-only mode, the engine 40 is in operation, while neither the first motor 41 nor the second motor 42 is in operation; the first clutch 31 is in a combined state, and the second clutch 32 is in a separated state; and the synchronizer 44 controls the third rotating shaft 23 to be disconnected with the output gear 72 of the third gear train 7.

In this case, the vehicle is driven by the engine 40 alone. The power output from the engine 40 is transmitted to the first gear train 5 through the first rotating shaft 21, the first clutch 31, the first transmission cylinder 11, and the second rotating shaft 22, and then transmitted to the wheel 10 through the first gear train 5, the third rotating shaft 23, and the differential 45, such that the mode of driving the vehicle by the engine 40 alone is achieved.

Optionally, the first motor 41 may be adjusted to a power generation mode according to the speed of the vehicle and torque demands, that is, a portion of the output power of the engine 40 is transmitted to the first motor 41 through the planetary gear train to drive the first motor 41 to rotate, thereby driving the first motor 41 to generate power.

Figure 6:
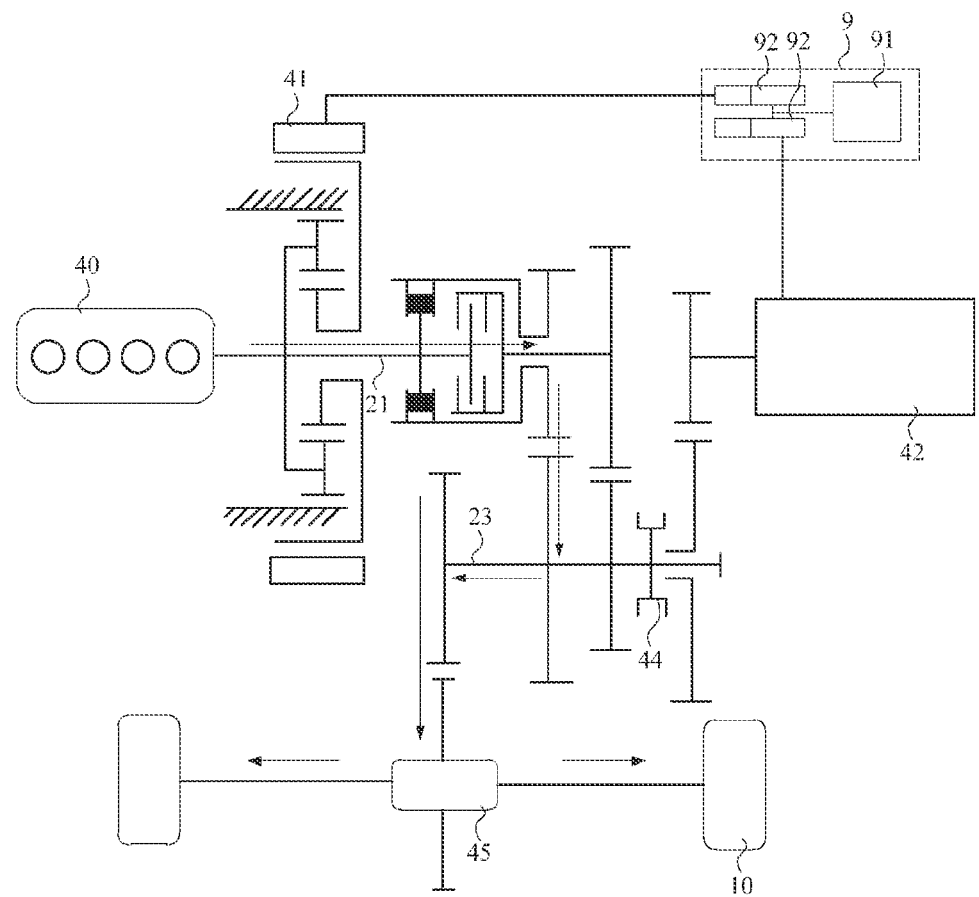
FIG. 6 is a schematic diagram illustrating power transfer of a hybrid power system in an engine-only mode according to an embodiment of the present disclosure.

FIG. 6 is a schematic diagram illustrating the power transfer of a hybrid power system in an engine-only mode according to an embodiment of the present disclosure. As shown in FIG. 6, in the engine-only mode, the engine 40 is in operation, while neither the first motor 41 nor the second motor 42 is in operation; the first clutch 31 is in a separated state, and the second clutch 32 is in a combined state; and the synchronizer 44 controls the third rotating shaft 23 to be disconnected with the output gear 72 of the third gear train 7.

In this case, the vehicle is driven by the engine 40 alone. The power output from the engine 40 is transmitted to the second gear train 6 through the first rotating shaft 21, the second clutch 32, and the second transmission cylinder 12, and then transmitted to the wheel 10 through the second gear train 6, the third rotating shaft 23, and the differential 45, such that the mode of driving the vehicle by the engine 40 alone is achieved.

Optionally, the first motor 41 may be adjusted to the power generation mode according to the speed of the vehicle and torque demands, that is, a portion of the output power of the engine 40 is transmitted to the first motor 41 through the planetary gear train to drive the first motor 41 to rotate, thereby driving the first motor 41 to generate power.

Figure 7:
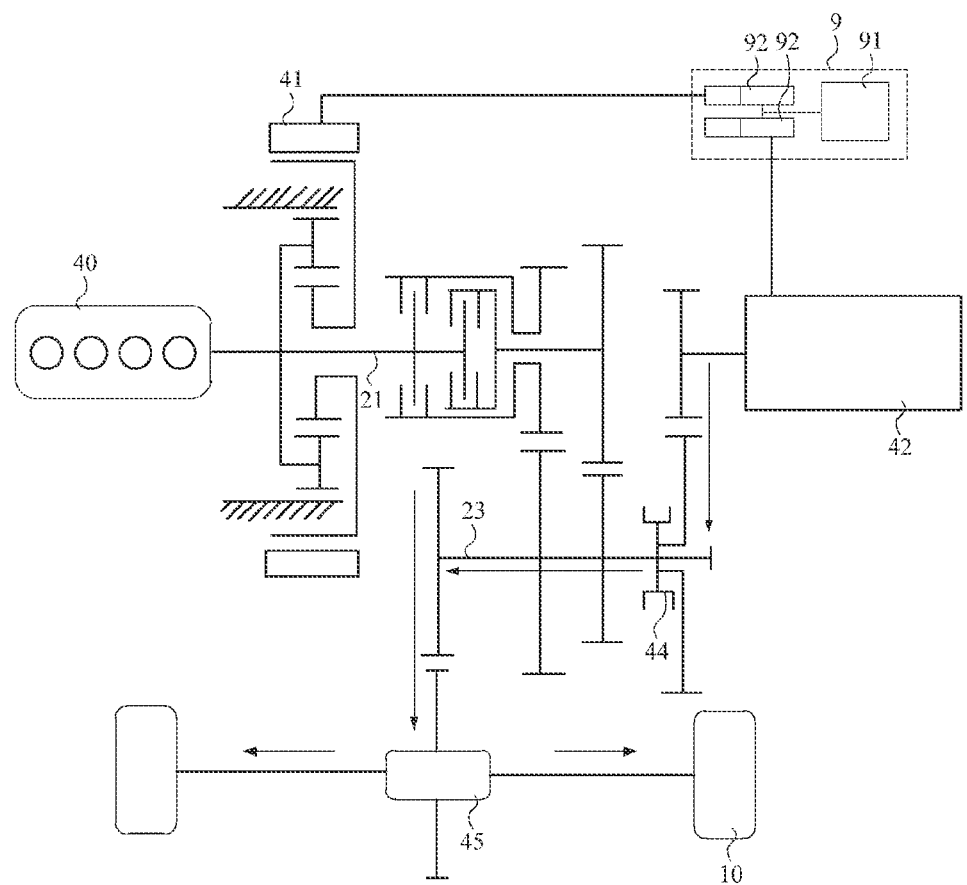
FIG. 7 is a schematic diagram illustrating power transfer of a hybrid power system in a pure-electric mode according to an embodiment of the present disclosure.

FIG. 7 is a schematic diagram illustrating the power transfer of a hybrid power system in a pure-electric mode according to an embodiment of the present disclosure. As shown in FIG. 7, in the pure-electric mode, neither the engine 40 nor the first motor 41 is in operation, while the second motor 42 is in operation; the first clutch 31 and the second clutch 32 are both in a separated state; and the synchronizer 44 controls the third rotating shaft 23 to be connected with the output gear 72 of the third gear train 7.

In this case, the second motor 42 drives the vehicle. The power supply assembly 9 discharges, and the direct current is converted into a three-phase alternating current through the inverter 92 to drive the second motor 42 to rotate; the second motor 42 converts the electric energy into mechanical energy, which is transmitted to the third gear train 7 and the third rotating shaft 23, and then transmitted to the wheel 10 through the differential 45, such that the mode of driving the vehicle by the second motor 42 is achieved.

In the embodiments of the present disclosure, in the pure-electric mode, the first motor 41 and the second motor 42 may also drive the vehicle together. In this case, the first motor 41 also outputs power to drive the vehicle. The power from the first motor 41 is transmitted to the third rotating shaft 23 by the first gear train 5 or the second gear train 6 under the control of the first clutch 31 or the second clutch 32, and coupled with the power output from the second motor 42 at the third rotating shaft 23, thus driving the vehicle together.

Optionally, in the pure-electric mode, the vehicle can also be driven in reverse gear, and in this case, the second motor 42 reverses to realize reverse.

Figure 8:
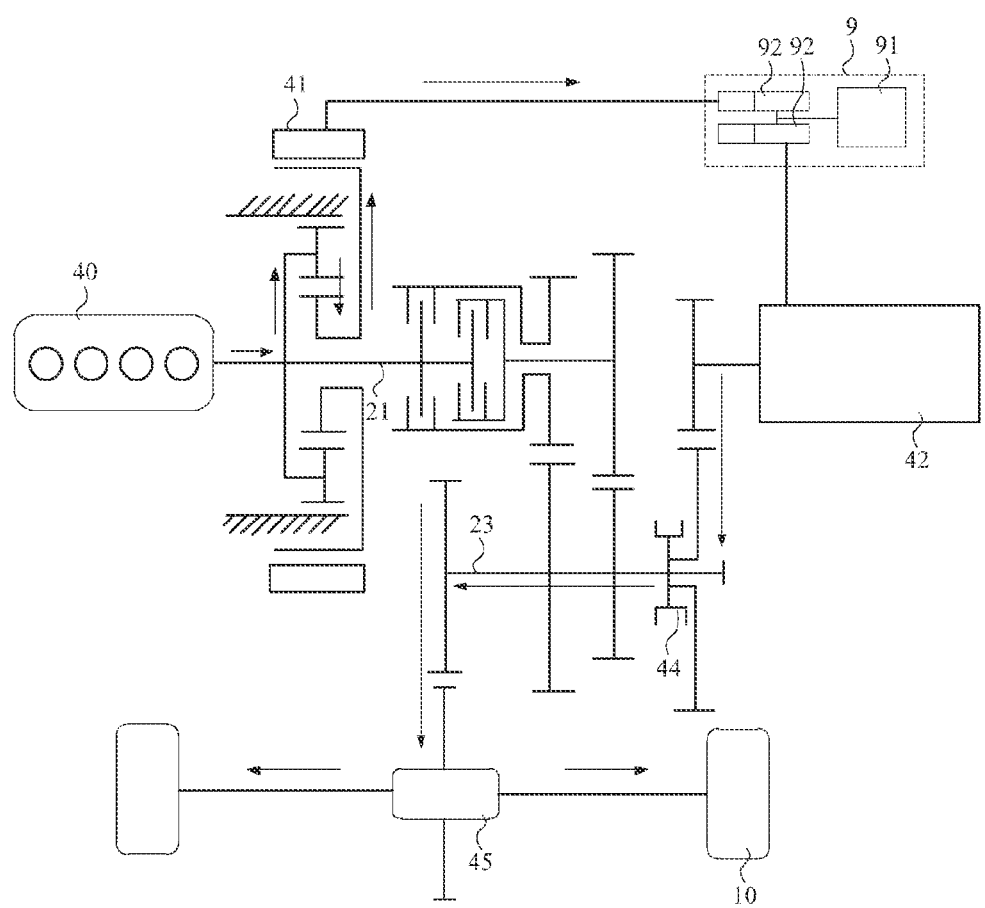
FIG. 8 is a schematic diagram illustrating power transfer of a hybrid power system in a hybrid driving mode according to an embodiment of the present disclosure.

FIG. 8 is a schematic diagram illustrating the power transfer of a hybrid power system in a hybrid driving mode according to an embodiment of the present disclosure. As shown in FIG. 8, in the hybrid driving mode, the engine 40 and the second motor 42 are both in operation, and the first motor 41 is in the power generation mode. The first clutch 31 and the second clutch 32 are both in a separated state, and the synchronizer 44 controls the third rotating shaft 23 to be connected with the output gear 72 of the third gear train 7.

In this case, the engine 40, the first motor 41, and the second motor 42 work in cooperation to jointly drive the vehicle. The engine 40 runs in a high-efficiency area, the power output from the engine 40 is transmitted to the first motor 41 through the planetary gear train to drive the first motor 41 to generate electricity, and the electric energy generated by the first motor 41 is stored in the power supply assembly 9. Additionally, the power supply assembly 9 outputs electric energy for the second motor 42 to drive the vehicle. In the case that the power generated by the first motor 41 is insufficient, it is supplemented by the power supply assembly 9. The first motor 41 and the power supply assembly 9 jointly meet the power demand of the second motor 42.

Figure 9:
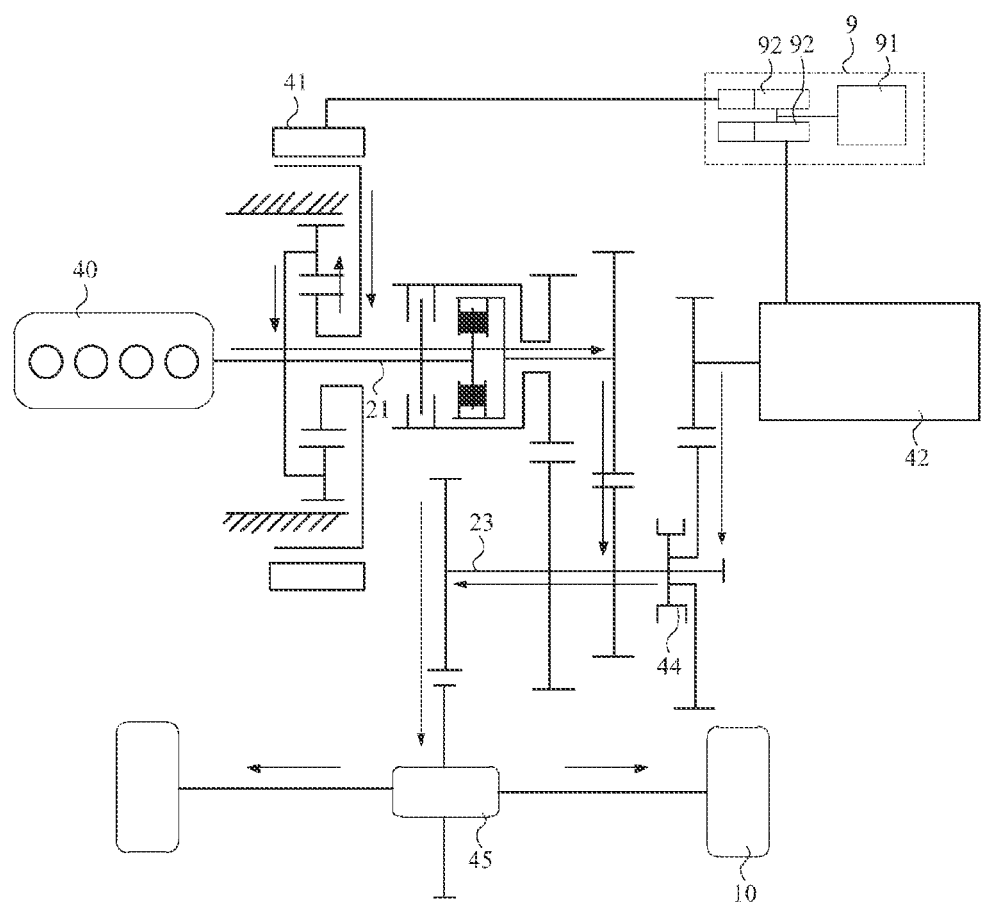
FIG. 9 is a schematic diagram illustrating the power transfer of a hybrid power system in a hybrid driving mode according to an embodiment of the present disclosure.

FIG. 9 is a schematic diagram illustrating the power transfer of a hybrid power system in a hybrid driving mode according to an embodiment of the present disclosure. As shown in FIG. 9, in the hybrid driving mode, the engine 40, the first motor 41, and the second motor 42 are all in operation. The first clutch 31 is in a combined state, the second clutch 32 is in a separated state, and the synchronizer 44 controls the third rotating shaft 23 to be connected with the output gear 72 of the third gear train 7.

In this case, the engine 40, the first motor 41, and the second motor 42 work in cooperation to jointly drive the vehicle, greater power may be output and thus the dynamics of the entire vehicle is improved. In the hybrid driving mode, the kinetic energy of the engine 40 and the first motor 41 is transmitted to the first gear train 5 through the first rotating shaft 21, the first clutch 31, the first transmission cylinder 11, and the second rotating shaft 22. The power is coupled with the power from the second motor 42 at the third rotating shaft 23, and it is then transmitted to the wheel 10 through the differential 45, such that the purpose of driving the vehicle with the three power sources simultaneously is achieved.

Figure 10:
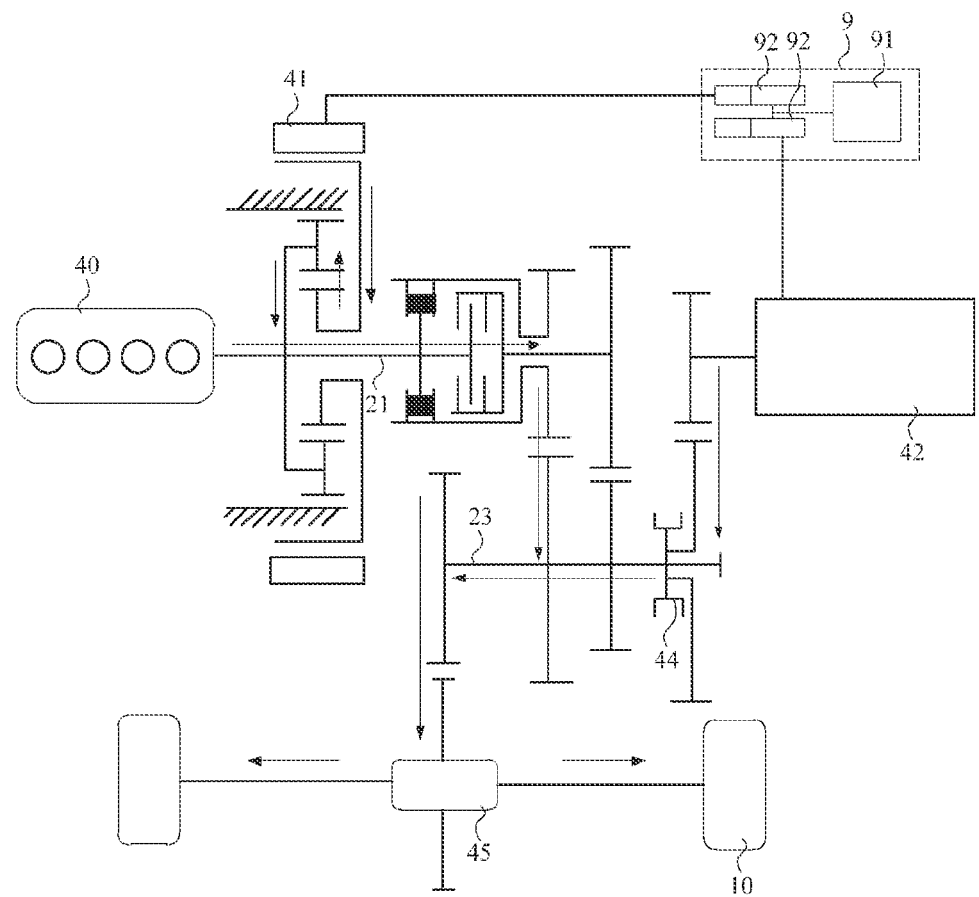
FIG. 10 is a schematic diagram illustrating the power transfer of a hybrid power system in a hybrid driving mode according to an embodiment of the present disclosure.

FIG. 10 is a schematic diagram illustrating the power transfer of a hybrid power system in a hybrid driving mode according to an embodiment of the present disclosure. As shown in FIG. 10, in the hybrid driving mode, the engine 40, the first motor 41, and the second motor 42 are all in operation, the first clutch 31 is in a separated state, and the second clutch 32 is in a combined state. The synchronizer 44 controls the third rotating shaft 23 to be connected with the output gear 72 of the third gear train 7.

In this case, the engine 40, the first motor 41, and the second motor 42 work in cooperation to jointly drive the vehicle, greater power may be output and thus the dynamics of the entire vehicle is improved. In the hybrid driving mode, the kinetic energy of the engine 40 and the first motor 41 is transmitted to the second gear train 6 through the first rotating shaft 21, the second clutch 32, and the second transmission cylinder 12; and the power is coupled with the power from the second motor 42 at the third rotating shaft 23, and it is then transmitted to the wheel 10 through the differential 45, such that the purpose of driving the vehicle with the three power sources simultaneously is achieved.

Figure 11:
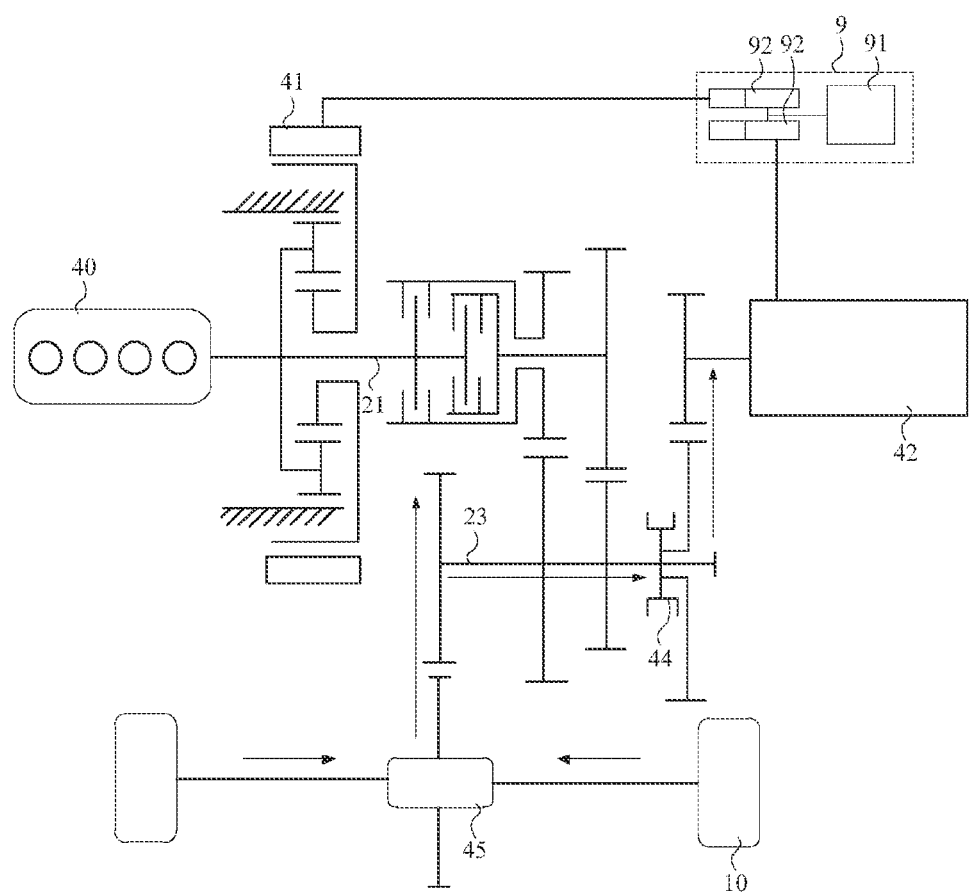
FIG. 11 is a schematic diagram illustrating the power transfer of a hybrid power system in a power recovery mode according to an embodiment of the present disclosure.

FIG. 11 is a schematic diagram illustrating the power transfer of a hybrid power system in a power recovery mode according to an embodiment of the present disclosure. As shown, in the power recovery mode, neither the engine 40 nor the first motor 41 is in operation, while the second motor 42 is in the power generation mode. The first clutch 31 and the second clutch 32 are both in a separated state, and the synchronizer 44 controls the third rotating shaft 23 to be connected with the output gear 72 of the third gear train 7.

In this case, when the vehicle is coasting or braking, the power system provides torque in a reverse direction to the vehicle, and a portion of the kinetic energy of the vehicle is converted into electric energy through the second motor 42 and stored in the power supply assembly 9 for standby. Under the coasting and braking conditions, the second motor 42 starts the power generation mode, and the kinetic energy of the entire vehicle is transmitted to the third gear train 7 through the wheel 10, the differential 45, and the third rotating shaft 23; then the second motor 42 is driven by the third gear train 7 to generate electricity, and the electric energy is stored in the power supply assembly 9 through the inverter 92, such that the energy recovery function of the second motor 42 is achieved.

The above description does not limit the present disclosure in any way. Although the present disclosure has been disclosed as above through the embodiments, they are not intended to limit the present disclosure. Those skilled in the art are able to make some changes or modifications to the above disclosed technical contents to give equivalent embodiments of equivalent changes without departing from the scope of the present disclosure. However, any simple alterations, equivalent changes, and modifications made, without departing from the contents of the technical solutions of the present disclosure, on the above embodiments based on the technical essence of the present disclosure shall fall within the scope of the technical solutions of the present disclosure.

The invention claimed is:

1. A hybrid power system, comprising a dual-clutch assembly, an engine, a first motor, a first gear train, and a second gear train, wherein the dual-clutch assembly comprises a first rotating shaft, a second rotating shaft, a hollow shaft, a first clutch, and a second clutch;
wherein the first rotating shaft and the second rotating shaft are arranged coaxially at intervals, and the hollow shaft is sleeved outside the second rotating shaft;
wherein the first clutch is between the first rotating shaft and the second rotating shaft, a driving part of the first clutch is connected with the first rotating shaft, and a driven part of the first clutch is connected with the second rotating shaft; and
wherein a driving part of the second clutch is on one side, away from the second rotating shaft, of the first clutch and is connected with the first rotating shaft, wherein the one side is away from the second rotating shaft, and wherein a driven part of the second clutch is connected with the hollow shaft;
wherein the engine and the first motor are both in transmission connection with the first rotating shaft;
wherein an input gear of the first gear train is coaxially connected with the second rotating shaft, an input gear of the second gear train is coaxially connected with the hollow shaft, and an output gear of the first gear train and an output gear of the second gear train are both in transmission connection with a wheel;
wherein the hybrid power system further comprises a second motor and a third rotating shaft;
wherein the second motor is in transmission connection with the third rotating shaft; and
wherein the output gear of the first gear train and the output gear of the second gear train are both coaxially sleeved outside the third rotating shaft, and the third rotating shaft is in transmission connection with the wheel.

2. The hybrid power system according to claim 1, further comprising a planetary gear train which comprises a ring gear, a center gear, a plurality of planetary gears, and a planet carrier;
wherein the center gear is in the ring gear, each of the plurality of planetary gears is between the center gear and the ring gear and engages with the center gear and the ring gear, and the planet carrier is arranged coaxially with the center gear and connected with the plurality of planetary gears; and
wherein the engine is connected with the planet carrier, the planet carrier is coaxially connected with the first rotating shaft, the first motor is connected with the center gear, and the ring gear is locked.

3. The hybrid power system according to claim 2, wherein the planetary gear train is in a rotor of the first motor, and the center gear is connected with the rotor of the first motor.

4. The hybrid power system according to claim 3, further comprising an annular plate,
wherein the annular plate is movably sleeved outside the first rotating shaft and in the rotor of the first motor, an outer edge of the annular plate is connected with an inner wall of the first motor, and an inner edge of the annular plate is coaxially connected with the center gear.

5. The hybrid power system according to claim 1, further comprising a third gear train and a synchronizer,
wherein an input gear of the third gear train is coaxially connected with the second motor, and an output gear of the third gear train is movably sleeved outside the third rotating shaft; and
wherein the synchronizer is sleeved outside the third rotating shaft, and the synchronizer is configured to connect or disconnect the third rotating shaft to the output gear of the third gear train.

6. The hybrid power system according to claim 1, further comprising a third gear train and a third clutch, wherein an input gear of the third gear train is coaxially connected with the second motor through the third clutch, and an output gear of the third gear train is fixedly sleeved outside the third rotating shaft.

7. The hybrid power system according to claim 3, further comprising a power supply assembly which comprises a battery and two inverters, wherein each of the two inverters is connected to the battery, the first motor is connected to one of the two inverters, and the second motor is connected to another of the two inverters.

8. The hybrid power system according to claim 1, further comprising a fourth clutch, wherein the fourth clutch is connected between the first rotating shaft and the engine.

9. A vehicle, comprising the hybrid power system according to claim 3.

* * * * *